3,532,737
ESTERS OF ARYLGLYOXYLIC ACIDS
James E. Siggins, Bethlehem, N.Y., assignor to Sterling Drug Inc., New York, N.Y., a corporation of Delaware
No Drawing. Filed Feb. 2, 1967, Ser. No. 613,457
Int. Cl. C07c 69/66, 69/78; C07d 63/12
U.S. Cl. 260—476                        4 Claims

ABSTRACT OF THE DISCLOSURE

The compounds are esters and amides of alkylglyoxylic and arylglyoxylic acids, prepared from the free acids and the appropriate substituted alcohol, amine or alkyl halide. The compounds are useful as plasticizers, and the members of a subgroup are useful as hypoglycemic agents.

---

This invention relates to novel esters and amides of substituted glyoxylic acids and to the preparation thereof.

The compounds of the invention are of the following general formula:

$$R—CO—CO—R' \quad\quad (I)$$

wherein R is lower-alkyl, phenyl, benzyl, naphthyl or thienyl; and R' is halo-lower-alkoxy, di-halo-lower-alkoxy, halocycloalkoxy, halo-lower-alkylamino, lower-alkoxy-lower-alkoxy, lower-alkanoyloxy-lower-alkoxy, benzoyloxy-lower-alkoxy, cyano-lower-alkoxy, or di-lower-alkyl-amino-lower-alkoxy.

In the foregoing definitions, the terms "lower-alkyl" and "lower-alkoxy" refer to alkyl or alkoxy groups having from one to six carbon atoms which may be straight or branched, thus including, for example, methyl, ethyl, isopropyl, butyl, hexyl, methoxy, ethoxy, butoxy, and the like. The halogen atoms can be any of the four halogens, fluorine, chlorine, bromine and iodine. The cycloalkyl group has from five to seven ring members and a total of from five to nine carbon atoms, and can be substituted by lower-alkyl groups, thus including, for example, cyclopentyl, cyclohexyl, 4-methylcyclohexyl, cycloheptyl, and the like. The lower-alkanoyl groups are alkanoyl groups are alkanoyl groups having from one to six carbon atoms, thus including, for example, formyl, acetyl, propionyl, valeryl, caproyl, and the like.

The presence of simple substituents on the aryl rings (phenyl, benzyl, naphthyl, thienyl, benzoyloxy) does not adversely affect the useful physical properties of the compounds and such substituted compounds are the full equivalents of the compositions herein claimed. Illustrative but not limiting examples of such simple substituents are lower-alkyl, lower-alkoxy, halo and nitro.

The 2-oxo group of the acid moiety of the compounds of Formula I readily forms acetals with lower-alkanols or with lower-alkylene-1,2- or 1,3-glycols. Acetalization does not adversely affect the useful physical properties of the compounds and the acetals are the full equivalents of the compositions herein claimed.

The compounds of Formula I are prepared by esterification or amidation of the corresponding acids of formula R—CO—CO—OH. Various esterification procedures can be employed including the following:

(1) Reaction of an acid, R—CO—CO—OH, with an alcohol, R'—OH, in the presence of a strong acid, for example, a strong inorganic acid such as sulfuric acid or an organic sulfonic acid such as p-toluenesulfonic acid.

(2) Reaction of an acid halide, R—CO—CO—halide, the halide preferably being chloride or bromide, with an alcohol, R'—OH.

(3) Reaction of a salt of an acid, R—CO—CO—OM, where M is a cation, for example, sodium or potassium, with R'-halide, the halide being chloride, bromide or iodide.

(4) Reaction of an acid, R—CO—CO—OH, with R'-halide, the halide being chloride, bromide or iodide, in the presence of a tertiary amine, for example, triethylamine. Each of the foregoing procedures is preferably carried out in an inert organic solvent at a temperature between about 50° C. and 150° C.

The amidation process can be carried out by reacting an acid halide, R—CO—CO—halide, the halide preferably being chloride or bromide, with an amine R'—NH$_2$.

The compounds of Formula I are useful as plasticizers for resins, especially vinyl-type resins. For example, polyvinyl chloride can be mixed with 30–45% by weight of a compound of Formula I, optionally in the presence of other plasticizers and stabilizers, and a useful resin is thus produced.

The members of a subgroup within the scope of the compounds of Formula I also possess hypoglycemic activity and are therefore useful in lowering high blood sugar concentrations characteristic of diabetic conditions. This subgroup is of the Formula I wherein R is lower-alkyl or phenyl, and R' is halo-lower-alkoxy or lower-alkanoyloxy-lower-alkoxy. The terms lower-alkyl, halo-lower-alkoxy and lower-alkanoyloxy have the same meanings as given hereinabove.

The following examples will illustrate the invention without the latter being limited thereby.

EXAMPLE 1

2-chloroethyl phenylglyoxylate [C$_6$H$_5$COCOO(CH$_2$)$_2$Cl]

A mixture of 15.0 g. of phenylglyoxylic acid, 10.1 ml. of 2-chloroethanol, 1 g. of p-toluenesulfonic acid monohydrate and 60 ml. of ethylene dichloride was refluxed for six and one-half hours. The reaction mixture was poured into water, and the organic layer was separated, washed with water until neutral and dried over anhydrous calcium sulfate. The solution was concentrated to remove the solvent, and the residue was distilled in vacuo to give 17.7 g. of 2-chloroethyl phenylglyoxylate, B.P. 115° C. (0.08 mm.), $n_D^{25}=1.5360$.

EXAMPLE 2

2-chloroethyl pyruvate [CH$_3$COCOO(CH$_2$)$_2$Cl] was prepared from 42.0 g. of pyruvic acid, 43.5 ml. of 2-chloroethanol, 3.9 g. of p-toluenesulfonic acid monohydrate and 170 ml. of ethylene dichloride according to the procedure described above in Example 1. There was obtained 40.3 g. of 2-chloroethyl pyruvate, B.P. 105° C. (15 mm.), $n_D^{25}=1.4440$.

A mixture of 15.0 g. of 2-chloroethyl pyruvate, 26 ml. of ethyl orthoformate, 1.5 g. of p-toluenesulfonic acid monohydrate and 24 ml. of ethanol was kept at room temperature for two days and then refluxed for eight hours. The solvent was removed in vacuo and the residue poured into water containing 40 ml. of 5% sodium bicarbonate solution and ice. The product was extracted with ethylene dichloride, and the extracts were washed with water until neutral, dried over anhydrous calcium sulfate and concentrated in vacuo to remove the solvent. The residue was distilled in vacuo, and the fraction boiling at 106–113° C. (6 mm.) was redistilled to give 11.3 g. of 2-chloroethyl pyruvate diethyl acetal, B.P. 109° C. (7 mm.), $n_D^{25}=1.4362$.

Starting from the appropriate acids and alcohols and following the procedure of Example 1 above, the following compounds were prepared:

EXAMPLE 3

3-chloropropyl pyruvate [CH$_3$COCOO(CH$_2$)$_3$Cl], B.P. 131° C. (29 mm.), $n_D^{25}=1.4466$.

EXAMPLE 4
2-methoxyethyl pyruvate

[$CH_3COCOOCH_2CH_2CH_3OCH_3$]

B.P. 84° C. (8 mm.), $n_D^{25}$=1.4249.

EXAMPLE 5
1-chloro-2-propyl pyruvate

[$CH_3COCOOCH(CH_3)CH_2Cl$]

B.P. 85° C. (5 mm.), $n_D^{25}$=1.4450.

EXAMPLE 6
2-bromoethyl phenylglyoxylate

[$C_6H_5COCOOCH_2CH_2Br$]

B.P. 148° C. (0.01 mm.), $n_D^{25}$=1.5532.

EXAMPLE 7
1-chloro-2-propyl phenylglyoxylate

[$C_6H_5COCOOCH(CH_3)CH_2Cl$]

B.P. 121° C. (0.2 mm.), $n_D^{25}$=1.5243.

EXAMPLE 8
2-chlorocyclohexyl phenylglyoxylate

[$C_6H_5COCOOCHCH(Cl)CH_2CH_2$]
                          |__$CH_2CH_2$__|

M.P. 52.0–55° C. (corr.), B.P. 134° C. (0.3 mm.), $n_D^{25}$=1.5350.

EXAMPLE 9
2-chloro-1-(chloromethyl)ethyl phenylglyoxylate

[$C_6H_5COCOOCH(CH_2Cl)_2$]

B.P. 137–142° C. (0.03 mm.), $n_D^{25}$=1.5400.

EXAMPLE 10
2-chloroethyl p-tolylglyoxylate

[$4\text{-}CH_3C_6H_4COCOOCH_2CH_2Cl$]

B.P. 116° C. (0.08 mm.), $n_D^{25}$=1.5377.

EXAMPLE 11
2-fluoroethyl phenylglyoxylate

[$C_6H_5COCOOCH_2CH_2F$]

B.P. 115° C. (0.08 mm.), $n_D^{25}$=1.5133.

EXAMPLE 12
2,2-dichloroethyl phenylglyoxylate

[$C_6H_5COCOOCH_2CHCl_2$]

B.P. 108° C. (0.03 mm.), $n_D^{25}$=1.5412.

EXAMPLE 13
2-acetoxyethyl phenylglyoxylate

[$C_6H_5COCOOCH_2CH_2OOCCH_3$]

B.P. 134° C. (0.04 mm.), $n_D^{25}$=1.5092.

EXAMPLE 14
2-chloropentyl phenylglyoxylate

[$C_6H_5COCOOCH_2CH(Cl)CH_2CH_2CH_3$]

B.P. 114° C. (0.03 mm.), $n_D^{25}$=1.5171.

EXAMPLE 15
2-chlorohexyl phenylglyoxylate

[$C_6H_5COCOOCH_2CH(Cl)CH_2CH_2CH_2CH_3$]

B.P. 135–138° C. (0.03 mm.), $n_D^{25}$=1.5132.

EXAMPLE 16
2-chloroethyl p-methoxyphenylglyoxylate

[$4\text{-}CH_3OC_6H_4COCOOCH_2CH_2Cl$]

B.P. 140–143° C. (0.02 mm.), $n_D^{25}$=1.5600.

EXAMPLE 17
3-chloropropyl phenylglyoxylate

[$C_6H_5COCOOCH_2CH_2CH_2Cl$]

B.P. 125–127° C. (0.02 mm.), $n_D^{25}$=1.5288.

EXAMPLE 18
2-cyanoethyl phenylglyoxylate

[$C_6H_5COCOOCH_2CH_2CN$]

B.P. 149° C. (0.01 mm.), $n_D^{52}$=1.5304.

EXAMPLE 19
2-chloroethyl p-chlorophenylglyoxylate

[$4\text{-}ClC_6H_4COCOOCH_2CH_2Cl$]

B.P. 111° C. (0.03 mm.), $n_D^{25}$=1.5530. The starting p-chlorophenylglyoxylic acid had the M.P. 85–88° C.

EXAMPLE 20
2-chloroethyl 2-naphthaleneglyoxylate

[$C_{10}H_7COCOOCH_2CH_2Cl$]

B.P. 151° C. (0.02 mm.), $n_D^{25}$=1.6144.

EXAMPLE 21
2-chloroethyl o-nitrophenylpyruvate

[$2\text{-}O_2NC_6H_4CH_2COCOOCH_2CH_2Cl$]

B.P. 140–144° C. (0.03 mm.), $n_D^{25}$=1.5537.

EXAMPLE 22
2-chloroethyl m-nitrophenylglyoxylate

[$3\text{-}O_2NC_6H_4COCOOCH_2CH_2Cl$]

B.P. 161–164° C. (0.02 mm.), $n_D^{25}$=1.5590.

EXAMPLE 23
2-chloroethyl 2-thiopheneglyoxylate

[$SC_4H_3COCOOCH_2CH_2Cl$]

B.P. 111° C. (0.01 mm.), $n_D^{25}$=1.5708.

EXAMPLE 24
2-bromoethyl pyruvate [$CH_3COCOOCH_2CH_2Br$], B.P. 129° C. (27 mm.), $n_D^{25}$=1.4702.

EXAMPLE 25
2-acetoxyethyl pyruvate

[$CH_3COCOOCH_2CH_2OCOCH_3$]

B.P. 72–76° C. (0.03 mm.), $n_D^{25}$=1.4310.

EXAMPLE 26
2-chloroethyl phenylpyruvate

[$C_6H_5CH_2COCOOCH_2CH_2Cl$]

B.P. 126–134° C. (0.03 mm.), $n_D^{25}$=1.5535.

EXAMPLE 27
2-bromoethyl phenylpyruvate

[$C_6H_5CH_2COCOOCH_2CH_2Br_2$]

B.P. 137° C. (0.03 mm.), $n_D^{25}$=1.5703.

EXAMPLE 28
N-(2-chloroethyl)phenylglyoxylamide
[$C_6H_5COCONHCH_2CH_2Cl$]

A solution of phenylglyoxylyl chloride (from 30 g. of phenylglyoxylic acid and thionyl chloride) in 100 ml. of ethylene dichloride was added to a stirred of 21.8 g. of 2-chloroethylamine hydrochloride in 180 ml. of water. A solution of 16.0 g. of sodium hydroxide in 240 ml. of water was then added gradually over a period of 45 minutes until the pH of the mixture was 6.5–7. The organic layer was separated, washed with water and concentrated to remove the solvent. The residue crystallized to give N-(2-chloroethyl)phenylglyoxylamide, M.P. 46.4–49.0° C.

EXAMPLE 29

N-(2-bromoethyl)phenylglyoxylamide

[$C_6H_5COCONHCH_2CH_2Br$]

M.P. 63–67° C., was prepared from phenylglyoxylyl chloride and 2-bromoethylamine according to the procedure of Example 28.

EXAMPLE 30

2-dimethylaminoethyl phenylglyoxylate

[$C_6H_5COCOOCH_2CH_2N(CH_3)_2$]

To a solution of 76.0 g. of phenylglyoxylic acid in 800 ml. of methyl isobutyl ketone was added 83.0 g. of finely powdered potassium carbonate. The mixture was refluxed for four hours under a water separator. An additional 400 ml. of methyl isobutyl ketone was added, followed by 51.0 g. of 2-dimethylaminoethyl chloride, and the mixture was refluxed for one hour. The reaction mixture was filtered while hot, the removed solid washed with methyl isobutyl ketone, and the combined filtrate and washings concentrated to remove the solvent. The residue was taken up in chloroform, and the solution washed with water, a 1:1 mixture of sodium bicarbonate-sodium chloride solution, again with water, dried over anhydrous calcium sulfate and concentrated. The residue was distilled to give 2-dimethylaminoethyl phenylglyoxylate, B.P. 105° C. (0.04 mm.), $n_D^{25}=1.5120$. A sample of the base was dissolved in isopropyl alcohol and hydrogen chloride gas was passed through. There was thus obtained 2-dimethylaminoethyl phenylglyoxylate in the form of its hydrochloride salt, M.P. 113–120° C. when recrystallized from isopropyl alcohol.

EXAMPLE 31

Cyanomethyl phenylglyoxylate [$C_6H_5COCOOCH_2CN$]

To a solution of 25.5 g. of phenylglyoxylic acid and 23.5 ml. of triethylamine in 100 ml. of dimethylformamide was added 12.7 g. of chloroacetonitrile over a period of five minutes. The reaction mixture was stirred on a steam bath for five hours, then cooled and filtered. The filtrate was poured into water and the product extracted with chloroform. The extracts were washed with water and sodium bicarbonate solution, dried over anhydrous calcium sulfate and concentrated to remove the solvent. The residue was distilled to give 17 g. of cyanomethyl phenylglyoxylate, B.P. 123° C. (0.02 mm.), $n_D^{25}=1.5360$.

EXAMPLE 32

2-chloropropyl phenylglyoxylate

[$C_6H_5COCOOCH_2CHClCH_3$]

was prepared from phenylglyoxylic acid, 1 - bromo-2-chloropropane and triethylamine according to the procedure of Example 31. It had B.P. 84° C. (0.01 mm.), $n_D^{25}=1.5254$.

EXAMPLE 33

2-(p-nitrobenzoyloxy)ethyl phenylglyoxylate

[$C_6H_5COCOOCH_2CH_2OOCC_6H_4NO_2$-4]

was prepared from 10.6 g. of 2-chloroethyl phenylglyoxylate (Example 1), 8.4 g. of p-nitrobenzoic acid and 6.95 ml. of triethylamine according to the procedure of Example 31, and was obtained as a yellow solid, M.P. 82.5–84.0° C., when recrystallized from isopropyl alcohol.

EXAMPLE 34

2-(p-cyanobenzoyloxy)ethyl phenylglyoxylate

[$C_6H_5COCOOCH_2CH_2OOCC_6H_4CN$-4]

was prepared from 14.9 g. of 2-chloroethyl phenylglyoxylate (Example 1), 10.3 g. of p-cyanobenzoic acid and 9.8 ml. of triethylamine according to the procedure of Example 31, and was obtained as a tan solid, M.P. 77–77.5° C., when recrystallized from isopropyl alcohol.

I claim:
1. A compound of the formula

$$R—CO—CO—R'$$

wherein R is phenyl, benzyl, or naphthyl; and R' is halo-lower - alkoxy, di-halo - loweralkoxy, halocycloalkoxy wherein the cycloalkyl moiety has from five to seven ring members and a total of from five to nine carbon atoms, lower - alkoxy-lower-alkoxy, lower-alkanoyloxy-lower-alkoxy, or benzoyloxy-lower-alkoxy.

2. A compound according to claim 1 wherein R is phenyl, and R' is halo-lower-alkoxy or lower-alkanoyloxy-lower-alkoxy.

3. A compound according to claim 2 wherein R' is halo-lower-alkoxy.

4. 2-chloroethyl phenylglyoxylate, according to claim 3 wherein R' is 2-chloroethoxy.

References Cited

Huyser et al.: Journal Org. Chemistry 29(2), p. 278 (1964).

LORRAINE A. WEINBERGER, Primary Examiner

E. J. GLEIMAN, Assistant Examiner

U.S. Cl. X.R.

260—332.2, 31.2, 465, 469, 471, 473, 477, 483, 558, 999

PO-1050
(5/69)

UNITED STATES PATENT OFFICE
CERTIFICATE OF CORRECTION

Patent No. 3,532,737   Dated October 6, 1970

Inventor(s) James E. Siggins

It is certified that error appears in the above-identified patent and that said Letters Patent are hereby corrected as shown below:

Column 1, line 44, delete "are alkanoyl groups".

Column 2, line 25, "lower-alkanoyloxy" should read --lower-alkanoyloxy-lower-alkoxy--.

Column 3, line 4, "[$CH_3COCOOCH_2CH_2CH_3OCH_3$]" should read --[$CH_3COCOOCH_2CH_2OCH_3$]--; line 30, "(0.3 mm.)" should read --(0.03 mm.)--.

Column 4, line 12, "$n_D^{52}$" should read --$n_D^{25}$--; line 62, "[$C_6H_5CH_2COCOOCH_2CH_2Br_2$]" should read --[$C_6H_5CH_2COCOOCH_2CH_2Br$]--; line 71, insert "solution" after --stirred--.

Signed and sealed this 22nd day of June 1971.

(SEAL)
Attest:

EDWARD M. FLETCHER, JR.
Attesting Officer

WILLIAM E. SCHUYLER, JR.
Commissioner of Patents